(12) United States Patent
Saotome

(10) Patent No.: US 12,265,743 B2
(45) Date of Patent: Apr. 1, 2025

(54) PRINT JOB PROCESSING APPARATUS, PRINT JOB PROCESSING METHOD, IMAGE FORMING APPARATUS, AND COMPUTER READABLE STORAGE MEDIUM

(71) Applicant: CANON KABUSHIKI KAISHA, Tokyo (JP)

(72) Inventor: Yutaka Saotome, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/328,604

(22) Filed: Jun. 2, 2023

(65) Prior Publication Data

US 2023/0401017 A1 Dec. 14, 2023

(30) Foreign Application Priority Data

Jun. 8, 2022 (JP) ................................. 2022-093161

(51) Int. Cl.
*G06F 3/12* (2006.01)
(52) U.S. Cl.
CPC ............ *G06F 3/1219* (2013.01); *G06F 3/125* (2013.01)
(58) Field of Classification Search
CPC ................................ G06F 3/125; G06F 3/1219
See application file for complete search history.

(56) References Cited

U.S. PATENT DOCUMENTS

| 2014/0211247 A1* | 7/2014 | Matsuda | G06F 3/1219 |
| | | | 358/1.15 |
| 2016/0196093 A1* | 7/2016 | Bandyopadhyay | ... G06F 3/1285 |
| | | | 358/1.15 |

FOREIGN PATENT DOCUMENTS

JP 2010005905 A 1/2010

* cited by examiner

*Primary Examiner* — John R Wallace
(74) *Attorney, Agent, or Firm* — Canon U.S.A., Inc. IP Division

(57) ABSTRACT

A print job processing apparatus that processes print jobs for nesting printing to arrange images of the received print jobs side by side in a width direction of a sheet, calculate a margin width of the sheet for already-arranged images and replace a replaceable image with an image of a newly-received print job in a case where the image of the newly-received print job is not arrangeable in a margin with the margin width calculated for the already-arranged images, in which the replaceable image is an image included in the already-arranged images, and is such an image that the margin width after replacement of the replaceable image with the image of the newly-received print job is equal to or longer than zero and is shorter than the margin width before the replacement.

16 Claims, 11 Drawing Sheets

| ATTRIBUTE ID | ATTRIBUTE VALUE |
|---|---|
| ... | ... |
| 11 | 60 |
| 31 | 1500 |
| 32 | 1 |
| 33 | 100 |
| ... | ... |

| ATTRIBUTE | ATTRIBUTE ID |
|---|---|
| ... | ... |
| RECEPTION WAITING TIME | 11 |
| ARRANGEABLE WIDTH | 31 |
| REPLACEMENT ALLOWANCE FLAG | 32 |
| MAXIMUM ACCEPTABLE WIDTH | 33 |
| ... | ... |

| REPLACEMENT | REPLACEMENT FLAG |
|---|---|
| ALLOWED | 1 |
| NOT ALLOWED | 0 |

FIG.10A

| JOB NUMBER | WIDTH OF IMAGE | RECEPTION TIME POINT | ARRANGEMENT FLAG |
|---|---|---|---|
| 001 | 600 | 13:01:01 | 1 |
| | | | |
| | | | |
| | | | |

FIG.10B

| JOB NUMBER | WIDTH OF IMAGE | RECEPTION TIME POINT | ARRANGEMENT FLAG |
|---|---|---|---|
| 001 | 600 | 13:01:01 | 1 |
| 002 | 500 | 13:01:30 | 1 |
| | | | |
| | | | |

FIG.10C

| JOB NUMBER | WIDTH OF IMAGE | RECEPTION TIME POINT | ARRANGEMENT FLAG |
|---|---|---|---|
| 001 | 600 | 13:01:01 | 1 |
| 002 | 500 | 13:01:30 | 1 |
| 003 | 1000 | 13:01:45 | 0 |
| | | | |

FIG.10D

| JOB NUMBER | WIDTH OF IMAGE | RECEPTION TIME POINT | ARRANGEMENT FLAG |
|---|---|---|---|
| 001 | 600 | 13:01:01 | 1 |
| 002 | 500 | 13:01:30 | 1 |
| 003 | 1000 | 13:01:45 | 0 |
| 004 | 400 | 13:01:59 | 1 |

FIG.10E

| JOB NUMBER | WIDTH OF IMAGE | RECEPTION TIME POINT | ARRANGEMENT FLAG |
|---|---|---|---|
| 003 | 1000 | 13:01:45 | 0 |
| | | | |
| | | | |
| | | | |

FIG.10F

| JOB NUMBER | WIDTH OF IMAGE | RECEPTION TIME POINT | ARRANGEMENT FLAG |
|---|---|---|---|
| 003 | 1000 | 13:01:45 | 1 |
| | | | |
| | | | |
| | | | |

PRINT JOB PROCESSING APPARATUS, PRINT JOB PROCESSING METHOD, IMAGE FORMING APPARATUS, AND COMPUTER READABLE STORAGE MEDIUM

BACKGROUND OF THE DISCLOSURE

Field of the Disclosure

The present disclosure relates to a print job processing apparatus, a print job processing method, an image forming apparatus, and a computer readable storage medium.

Description of the Related Art

Among image forming apparatuses such as printers, an image forming apparatus such as a large-format printer that prints images on a large sheet such as a large-format roll paper to print posters or the like is recently widely used. Normally, in the large-format printer, multiple images are printed while being arranged in a row in a sheet conveyance direction such that left ends of the images are aligned with a left end of the large sheet.

In a case where a roll paper with a width far longer than a width of an image indicated by image data is set in the image forming apparatus such as the large-format printer described above, a large margin remains in a region from the right end of the printed image to the right end of the sheet, and the sheet is thus wasted. Accordingly, nesting printing in which multiple images are arranged side by side in a main scanning direction of the sheet and then printed on the sheet is increasingly used. In this case, the main scanning direction is a direction in which scanning of the sheet is performed by a print head that reciprocates, and generally coincides with the width direction of the sheet. Moreover, the main scanning direction normally intersects a sheet conveyance direction.

In the nesting printing, images corresponding to image data included in print jobs received in respective waiting periods are accumulated and then arranged in the main scanning direction one by one. A margin width on a terminal end side in the main scanning direction thereby gradually decreases. Then, in a case where image data corresponding to an image with a width longer than the current margin width in the main scanning direction is received, images accumulated until then are collectively printed. Then, the image data corresponding to the image with the width longer than the current margin width in the main scanning direction is carried over to subsequent printing (printing to be started after further conveyance of the sheet).

Japanese Patent Laid-Open No. 2010-5905 (hereinafter, referred to as Literature 1) discloses a technique relating to a printing apparatus that can distribute images to multiple print media and print the images. In this printing apparatus, each piece of image data is distributed to a print medium specified by a print job among the multiple print media. Then, multiple pieces of image data distributed to a common print medium are arranged on the common print medium, and printing is executed. Literature 1 explains that two-dimensional layout adjustment including rotation of images is performed to reduce wasting of the sheet.

In normal nesting printing, there is a case where printing is started even though the margin width in the main scanning direction of the sheet is large. For example, in a case where a new print job is received subsequent to previous print jobs including images which have been arranged leaving a large margin width, and the width of the new print job is longer than the large margin width, the image of the new job is not arranged and the printing is started with the large margin width being left. Accordingly, the normal nesting printing has a disadvantage that function of preventing occurrence of sheet wasting may be insufficient.

SUMMARY OF THE DISCLOSURE

An embodiment of the present disclosure is a print job processing apparatus that processes print jobs for nesting printing, comprising: an arrangement unit configured to arrange images of the received print jobs side by side in a width direction of a sheet; a calculation unit configured to calculate a margin width of the sheet for already-arranged images; and a replacement unit configured to replace a replaceable image with an image of a newly-received print job in a case where the image of the newly-received print job is not arrangeable in a margin with the margin width calculated for the already-arranged images, in which the replaceable image is an image included in the already-arranged images, and is such an image that the margin width after replacement of the replaceable image with the image of the newly-received print job is equal to or longer than zero and is shorter than the margin width before the replacement.

Further features of the present disclosure will become apparent from the following description of exemplary embodiments with reference to the attached drawings.

BRIEF DESCRIPTION OF THE DRAWINGS

FIGS. 10A to 10F are diagrams illustrating first to sixth states of a print job list.

DESCRIPTION OF THE EMBODIMENTS

Figure 1:
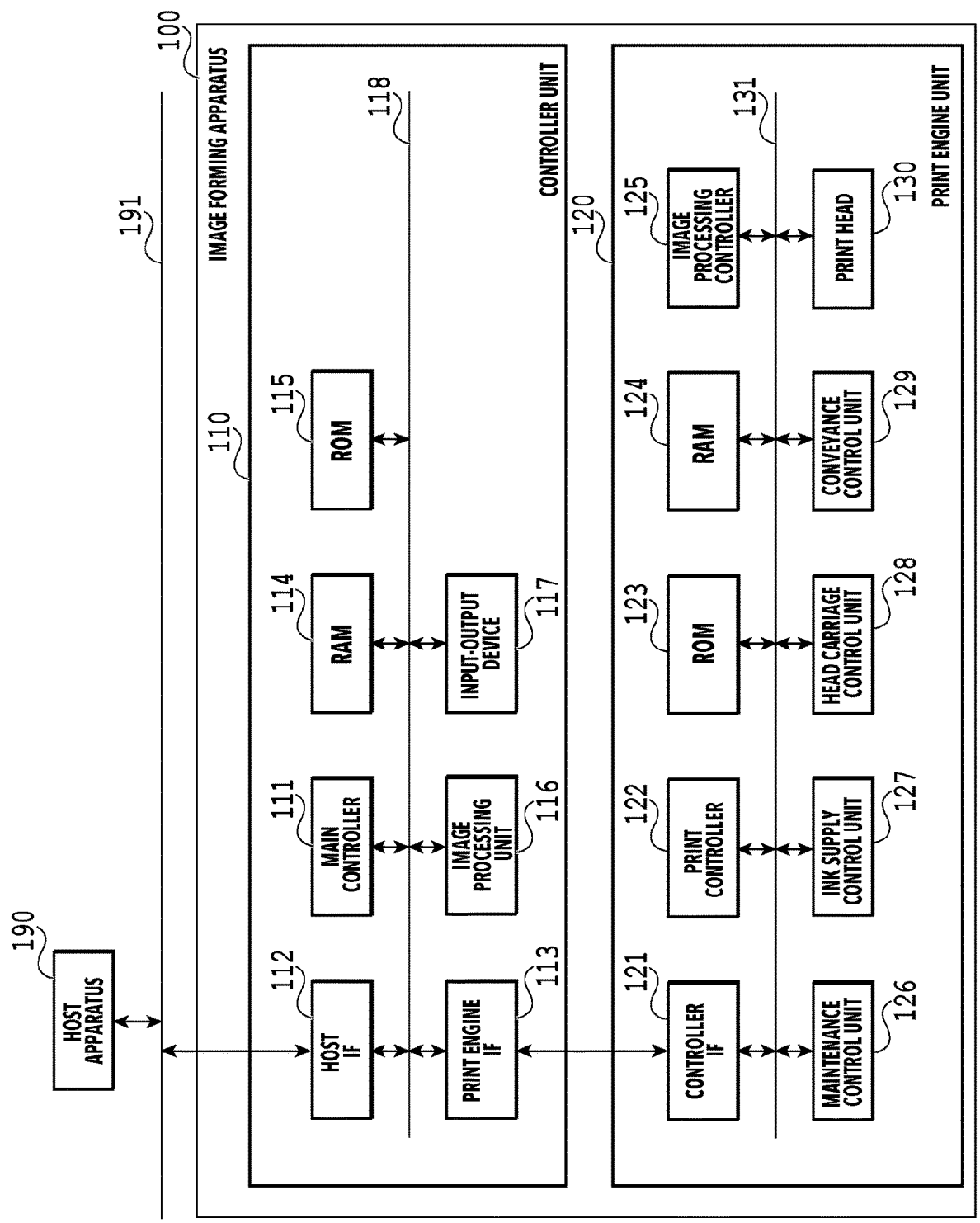
FIG. 1 is a block diagram illustrating an overall internal configuration of an image forming apparatus.

Details of embodiments are described below with reference to the attached drawings. Note that the following embodiments do not limit the present disclosure according to the scope of claims. Although multiple features are described in the embodiments, not all of the described multiple features are necessarily essential for the present disclosure, and the multiple features may be combined in any combination. Moreover, the same or similar configurations are denoted by the same reference numerals in the attached drawings, and iterated description will be omitted.

(Apparatus Configuration)

FIG. 1 is a diagram illustrating an overall configuration of an image forming apparatus according to the present disclosure. Although an image forming apparatus having only a print function is described as the image forming apparatus in the present disclosure, the image forming apparatus is not limited to this. For example, the image forming apparatus may be an apparatus that functions as a copying machine by further having a scanning function of scanning an original image or an apparatus that functions as multi-function peripheral (MFP) by adding other functions.

In FIG. 1, the image forming apparatus 100 includes a controller unit 110 and a print engine unit 120 that is a print unit. Moreover, the image forming apparatus 100 can be coupled to a host apparatus 190 via a network 191. The controller unit 110 includes a main controller 111, a host IF 112, a print engine IF 113, a RAM 114, a ROM 115, an image processing unit 116, and an input-output device 117. These units are coupled to one another via a system bus 118.

The main controller 111 formed of a CPU performs a print operation according to a program and various parameters stored in the ROM 115 while using the RAM 114 as a work area, and controls operations of the entire image forming apparatus 100. For example, in a case where image data is inputted from the host apparatus 190 via the host IF 112, the image processing unit 116 performs a predetermined image process on the received image data according to an instruction of the main controller 111. Then, the main controller 111 transmits the image data subjected to the image process to the print engine unit 120 via the print engine IF 113. The RAM 114 is used as the work area of the main controller 111, is used as a temporal storage area of various pieces of received data, and is used to temporarily store various pieces of setting data. The ROM 115 stores the program to be executed by the main controller 111 and various pieces of data necessary for various operations of the image forming apparatus 100.

The image processing unit 116 performs various image processes. For example, the image processing unit 116 performs a process of developing (converting) image data expressed in page description language to bitmap image data. For example, the image processing unit 116 performs a process of converting a color space (for example, YCbCr) of inputted image data into a standard RGB color space (for example SRGB). For example, the image processing unit 116 performs various image processes such as resolution conversion to an effective pixel number (number at which the image forming apparatus 100 can perform the print process), image analysis, and image correction as necessary. For example, the image processing unit 116 synthesizes multiple pieces of image data to generate one piece of image data. The image data obtained by these image processes is stored in the RAM 114. The input-output device 117 includes a hard key and a touch panel on which a user performs various operations and a display unit that displays (notifies) various pieces of information to the user. Moreover, the input-output device 117 may perform display of information to the user by outputting audio (buzzer, voice, or the like) based on audio information from an audio generation device.

The print engine unit 120 is a print unit that performs image formation. The print engine unit 120 includes a controller IF 121, a print controller 122, a ROM 123, a RAM 124, and an image processing controller 125. Furthermore, the print engine unit 120 includes a maintenance control unit 126, an ink supply control unit 127, a head carriage control unit 128, a conveyance control unit 129, and a print head 130. The units are coupled to one another via a system bus 131.

The print controller 122 formed of a CPU controls various mechanisms included in the print engine unit 120 according to a program and various parameters stored in the ROM 123 while using the RAM 124 as a work area. In a case where the print controller 122 receives various commands and image data via the controller IF 121, the print controller 122 temporarily stores the received commands and image data in the RAM 124.

The print controller 122 causes the image processing controller 125 to convert the stored image data to print data such that the print head 130 can use the data for a print operation. In a case where the print data is generated, the print controller 122 causes the print head 130 to execute the print operation (printing) based on the print data. In this case, the print controller 122 requests the conveyance control unit 129 to convey a sheet in a conveyance direction. The print head 130 executes the print operation involving reciprocating movement in a main scanning direction in conjunction with the conveyance operation of the sheet, according an instruction of the print controller 122, and the print process is performed. The head carriage control unit 128 changes the direction and position of the print head 130 depending on an operation state such as a maintenance state and a print state of the image forming apparatus 100. The ink supply control unit 127 controls pressure of ink supplied to the print head 130 such that the pressure is within an appropriate range. The maintenance control unit 126 controls cleaning of the print head 130 and a conveyance roller controlled by the conveyance control unit 129.

The print head 130 is a print unit that prints an image, and prints an image on a sheet based on image data. For example, the print head 130 is increased to multiple print heads, as many as multiple colors, and forms an image on a sheet by ejecting inks in synchronization with conveyance of the sheet. Although description is given by using an inkjet printer using inks as printing materials as an example of the image forming apparatus according to the present disclosure, the image forming apparatus is not limited to this. The contents of the present disclosure can be adopted into printing apparatuses of various methods such as a thermal printer (sublimation printer, thermal transfer printer, or the like), a dot-impact printer, and a printer of an electrophotographic method such as a LED printer or a laser printer.

Although the input-output device 117 is in an interior of the image forming apparatus 100 in the present disclosure, the input-output device 117 is not limited to this and, for example, may be coupled as an external configuration via the network 191. Moreover, the host apparatus 190 may also serve as the input-output device 117. Furthermore, another input-output device may be couplable to the image forming apparatus 100 via the network 191 or the like in addition to the input-output device 117. Moreover, although the image data is stored in the RAM 114 and the RAM 124 in the present disclosure, the image data may be stored in a non-volatile storage device such as a hard disk drive. The host apparatus 190 is, for example, an external apparatus that is a supply source of the image data, and a printer driver is installed in the host apparatus 190. A data providing apparatus that may serve as the supply source of the image data such as, for example, a digital camera or a smartphone may be coupled to the image forming apparatus 100 instead of the host apparatus 190. A coupling mode of the image forming apparatus 100 and each apparatus is not limited to that via the network 191 and, for example, the apparatuses may be directly coupled to each other via wireless communication.

Note that a program for implementing the function of the present disclosure may be supplied to a system or to an apparatus via a network or from various types of storage media. Moreover, a computer (CPU, MPU, or the like) of the system or of the apparatus may execute the functions or cause various mechanism to execute the functions by reading out the program. Furthermore, this program may be executed in one computer or executed by multiple computers in conjunction with each other. In addition, not all of the aforementioned processes have to be implemented by software, and some or all of the processes may be executed by hardware such as an ASIC. Moreover, the present disclosure is not limited to a mode in which all the processes are performed by one CPU, and may adopt a mode in which multiple CPUs perform the processes in cooperation as appropriate or a mode of performing processes in which one CPU executes one of the processes and multiple CPUs execute the other processes in cooperation.

First Embodiment

In a first embodiment, upon performing nesting printing, the image forming apparatus 100 first receives two print jobs while waiting for print job reception. A total width of the two images in total, corresponding to the two print jobs, in the main scanning direction (length in the main scanning direction) is the same as or shorter than a width of a printable region (length from a print start point to a print end point in the main scanning direction; hereinafter, referred to as "arrangeable width") in a sheet. Thereafter, the image forming apparatus 100 receives a third print job while waiting for print job reception. A width of an image corresponding to the third print job is longer than a current margin in the main scanning direction (that is a margin in a case where the two images in total corresponding to the first and second jobs are arranged side by side in the main scanning direction) of the sheet. Specifically, a total width in a case where the three images in total corresponding to the three print jobs are arranged side by side in the main scanning direction is longer than the arrangeable width. Moreover, a width of the image corresponding to the print job received first is shorter (narrower) than a width of the image corresponding to the print job received third. Furthermore, a total width of a width of the image corresponding to the print job received second and the width of the image corresponding to the print job received third is the same as or shorter than the arrangeable width. Accordingly, the image forming apparatus 100 replaces the print job received first with the print job received third, arranges the two images in total corresponding to the second and third print jobs side by side in the main scanning direction, and executes the printing. The image forming apparatus 100 prints the image corresponding to the first print job after the sheet is conveyed in the conveyance direction.

Figure 2:
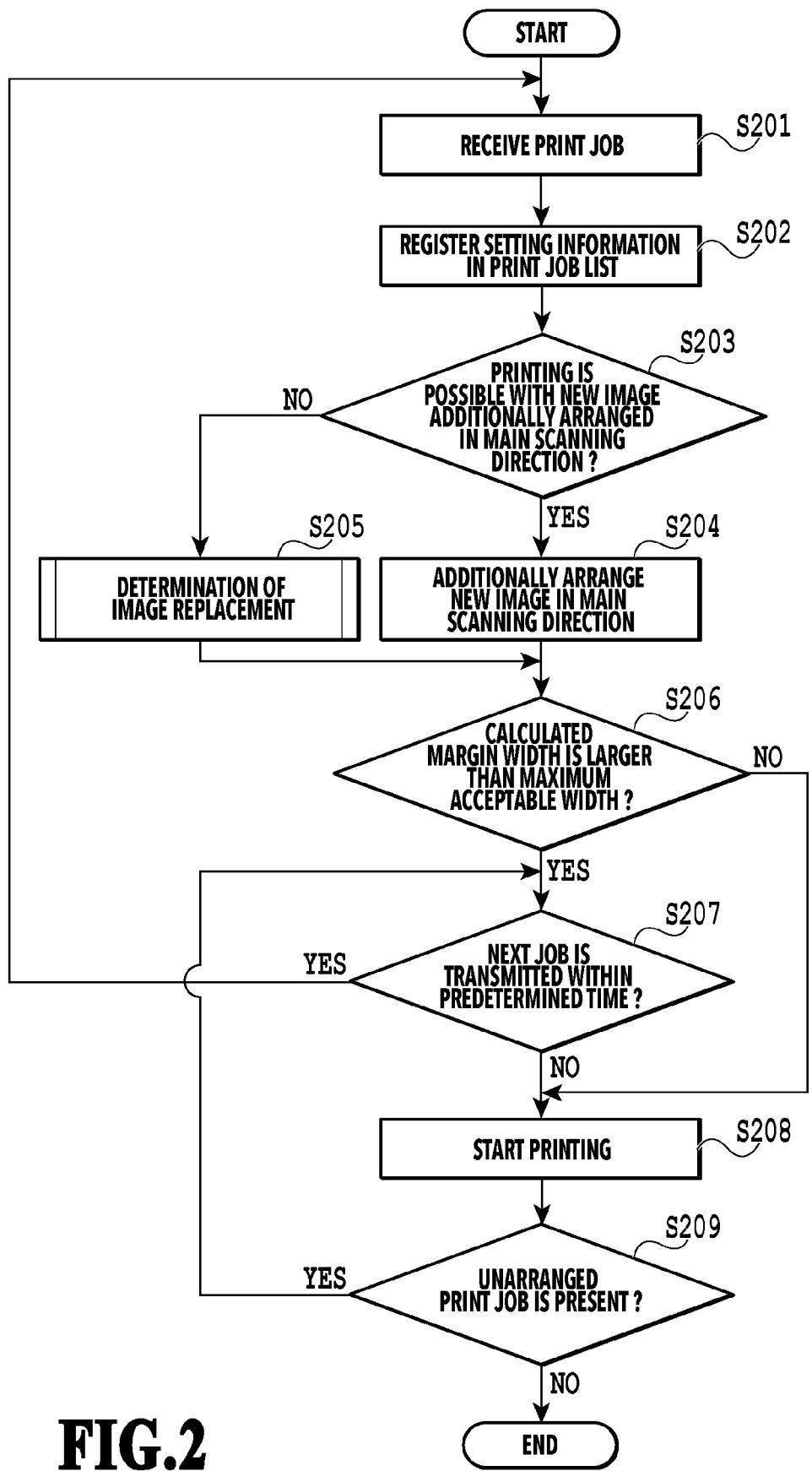
FIG. 2 is a flowchart of a process of receiving a print job and starting printing.

FIG. 2 is a flowchart illustrating a print procedure in the present embodiment. The main controller 111 performs the processes of the flowchart illustrated in FIG. 2 by loading program codes stored in the ROM 115 onto the RAM 114 and executing the program codes.

Figure 3:
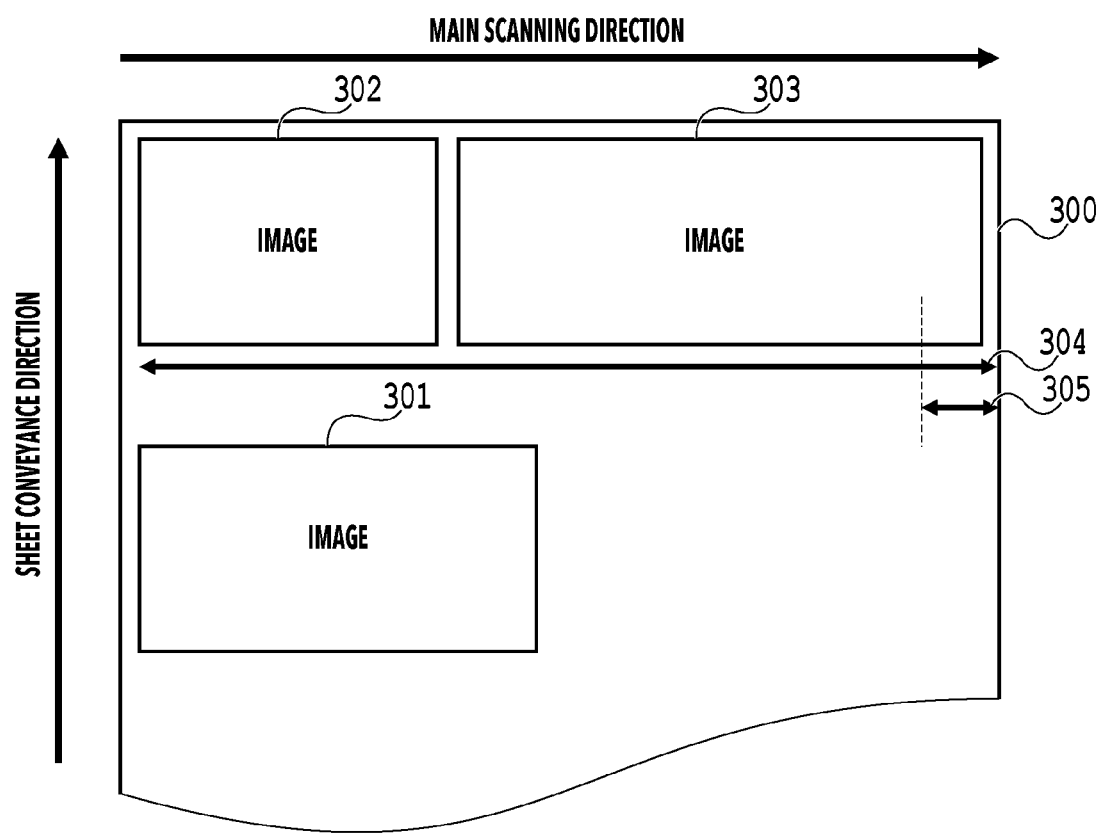
FIG. 3 is a schematic diagram illustrating an arrangement example in a case where multiple images are arranged.

FIG. 3 is a diagram illustrating images arranged on a sheet in the image forming apparatus 100. In the present embodiment, the image forming apparatus 100 receives a print job including image data corresponding to an image 301, a print job including image data corresponding to an image 302, and a print job including image data corresponding to an image 303 in order of this description. Then, the image forming apparatus 100 arranges the images 301, 302, and 303 on a sheet 300 as illustrated in FIG. 3. In FIG. 3, reference sign 304 denotes the arrangeable width. Moreover, reference sign 305 denotes a threshold (hereinafter, referred to as maximum acceptable width) that is compared with a margin to determine whether printing is to be executed or not. The image forming apparatus 100 basically executes printing in a case where both of first and second conditions described below are satisfied. In this case, the first condition is a condition in which a width of a combination of images arranged side by side from an arrangement start point toward an arrangement end point of the sheet in the main scanning direction is equal to or shorter than the arrangeable width. The second condition is a condition in which a margin width obtained by subtracting a total width by combining the images arranged side by side from the arrangement start point toward the arrangement end point of the sheet in the main scanning direction from the arrangeable width is equal to or shorter than the maximum acceptable width. Specifically, the image forming apparatus 100 executes printing, provided that a margin with a width equal to or shorter than the maximum acceptable width and equal to or longer than zero is formed in a case where images are arranged side by side from the arrangement start point toward the arrangement end point of the sheet in the main scanning direction.

The present embodiment is described below with reference to the overall configuration diagram of FIG. 1, the flowchart of FIG. 2, and the schematic diagram of FIG. 3.

The main controller 111 repeats a loop of steps S201 to step S207 as many times as the number of received print jobs. Accordingly, iterated description will be omitted or simplified. Note that "step S-" is abbreviated as "S-" hereinafter.

First, a process performed in a first loop is described.

In S201, the host IF 112 receives a first print job transmitted from the host apparatus 190. Here, "receives" means saving image data and setting information included in the received print job in a temporary storage unit in a communication lower layer.

Figure 4:
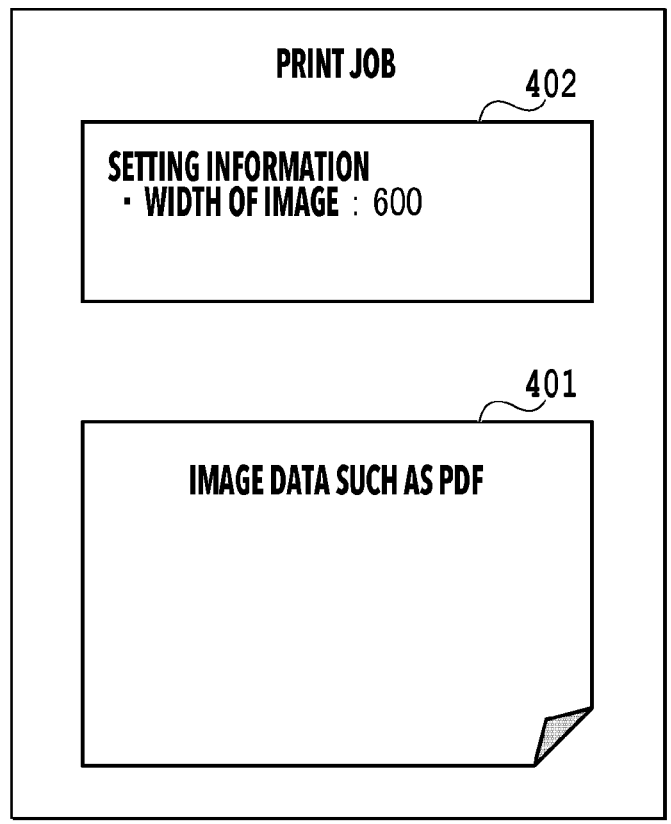
FIG. 4 is a schematic diagram illustrating a configuration of a print job.

FIG. 4 is a diagram illustrating a specific example of a data structure of the print job transmitted from the host apparatus 190. Image data 401 includes data desired by the user to be printed. For example, various image formats such as portable document format (PDF) and Joint Photographic Experts Group (JPEG) can be adopted as a format of the image data 401. Setting information 402 includes a setting value group to be set in printing of an image corresponding to the image data 401. As illustrated in FIG. 4, in the present embodiment, the setting information 402 includes at least a width of the image corresponding to the image data 401. Note that the setting information may additionally include information on reception waiting time of a print job, the maximum acceptable width, and the like. The image forming apparatus 100 executes the print process based on the image data 401 and the setting information 402 included in the print job.

In S202, the main controller 111 extracts the image data corresponding to the image 301 from the print job received first, and stores the image data in the RAM 114. Moreover, the main controller 111 extracts the setting information 402 from the print job received first, and registers the setting information with a list.

Figure 5A:
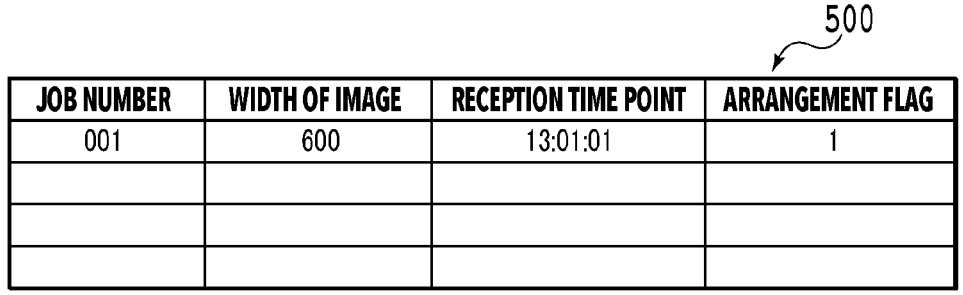
FIGS. 5A to 5E are diagrams illustrating first to fifth states of a print job list.
Figure 5B:
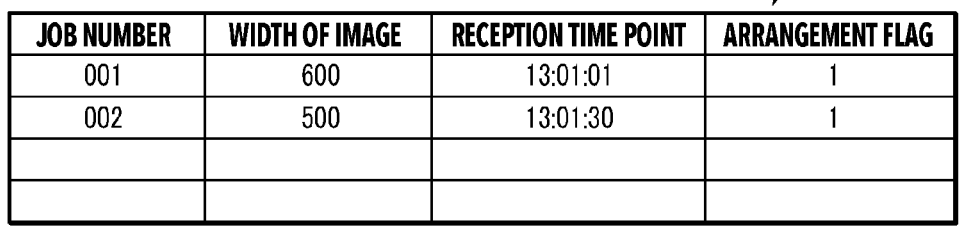
Figure 5C:
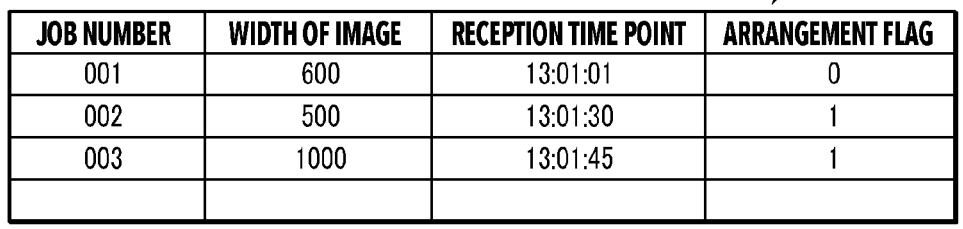
Figure 5D:
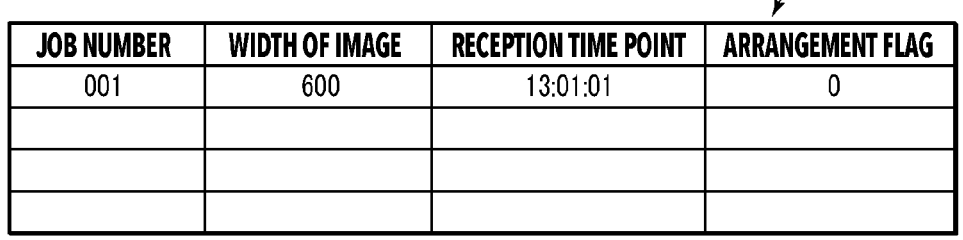
Figure 5E:
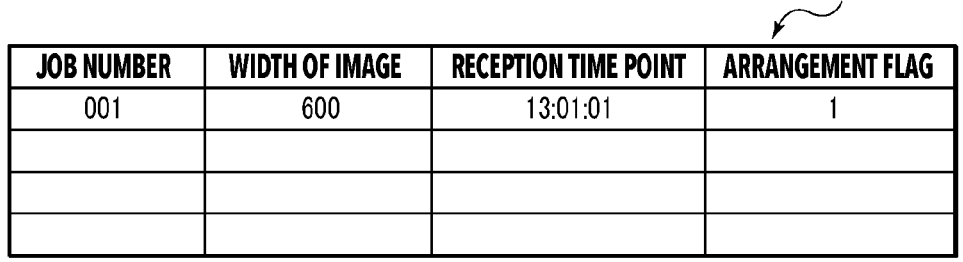
Figures 6A, 6B:
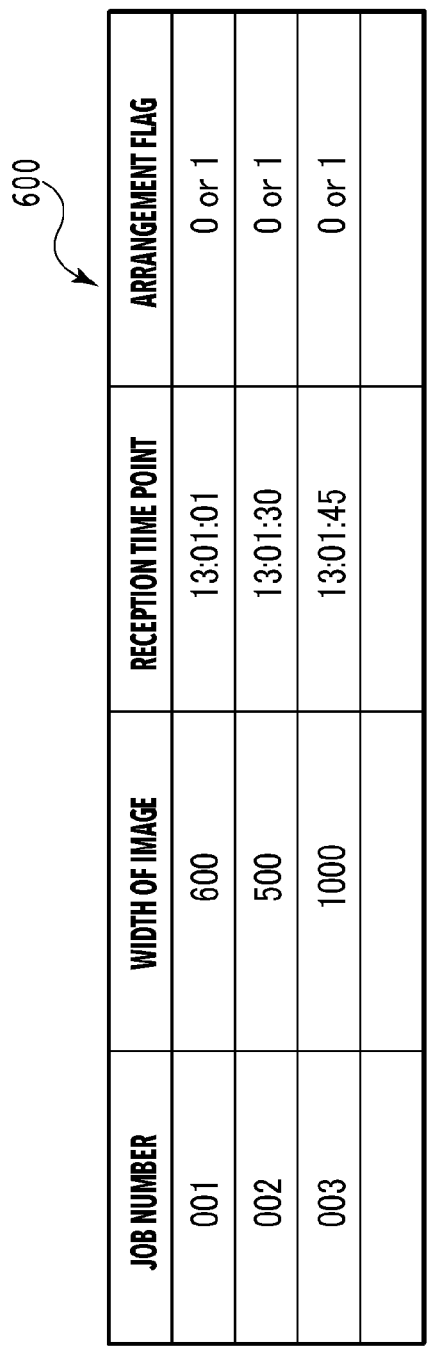
FIG. 6A is a diagram illustrating an example of a print job list and FIG. 6B is a diagram illustrating a relation between arrangement/non-arrangement and arrangement flag.

FIGS. 5A to 5E are diagrams illustrating a specific example of a print job list 600 as shown in FIG. 6 in which the setting information 402 and related data for three print jobs are registered as an example. For example, as illustrated in FIG. 5A, in the present embodiment, a number of a job including image data, a width of an image corresponding to the image data (part of the setting information 402), a reception time point, and an arrangement flag are registered for each print job in association with one another with the print job list 600. Note that the print job list 600 is stored in the RAM 114 in a rewritable manner.

In the registration of the setting information 402 including the width of the image with the print job list 600, the main controller 111 assigns the job number to each print job in ascending order. By referring to the job number, the main controller 111 can uniquely identify to which print job the registered information in the print job list 600 corresponds. Moreover, by referring to the job numbers, the main controller 111 can uniquely identify the reception orders of respective print jobs received by the host IF 112.

As illustrated in FIGS. 5A to 5E, in the present embodiment, the main controller 111 assigns "001" as the job number to the print job received first, and assigns the job numbers in ascending order to respective jobs received subsequently.

In the registration of the setting information 402 with the print job list 600, the main controller 111 also assigns the reception time points to respective received print j obs.

In the print job list 600, the arrangement flag indicates whether the image corresponding to the image data included in the print job is to be arranged or not as illustrated in a table of FIG. 6. Specifically, an image for which the corresponding arrangement flag is set to "1" is arranged side by side to follow a previous image in the main scanning direction, at a current target position in conveyance direction of the sheet. Note that the table illustrated in FIG. 6 is also stored in the RAM 114.

In a case where a new print job is to be added to the print job list 600, the arrangement flag is set as follows. Specifically, in a case where an image corresponding to this print job is to be arranged at a current position (row) in the sheet conveyance direction, the arrangement flag corresponding to this print job is set to a value corresponding to "arrange" ("1" according to the table of FIG. 6). Meanwhile, in a case where the image corresponding to this print job is not to be arranged at the current position (row) in the sheet conveyance direction, the arrangement flag corresponding to this print job is set to a value corresponding to "not arrange" ("0" according to the table of FIG. 6).

Moreover, the arrangement flag temporarily set to the value corresponding to "arrange" can be later changed to the value corresponding to "not arrange". Similarly, the arrangement flag temporarily set to the value corresponding to "not arrange" can be later changed to the value corresponding to "arrange".

Particularly, in a case where the value of the arrangement flag corresponding to the currently received print job is to be set to the value corresponding to "arrange", the arrangement flag corresponding to one of the already-received print jobs can be changed from the value corresponding to "arrange" to the value corresponding to "not arrange". The replacement of the image is thereby achieved.

Then, in a case where printing in current main scanning is to be actually executed, the images corresponding to the arrangement flags having the value corresponding to "arrange" are printed.

In S203, the main controller 111 refers to a database to obtain an arrangeable width 304. Moreover, the main controller 111 refers to the print job list 600 to obtain a current total width (a total width before addition) obtained by adding up the widths of the already-arranged images corresponding to the print jobs for which the arrangement flags are set to "1". Then, the main controller 111 adds the width of the image corresponding to the print job received in most-recently executed S201 to the current total width to obtain a new total width (a total width after addition; a first total width). Then, the main controller 111 determines whether or not the image corresponding to the print job received in most-recently executed S201 can be additionally arranged in the main scanning direction based on the new total width (a total width after addition) and the arrangeable width 304. In this case, in a case where the new total width is equal to or shorter than the arrangeable width 304, the image corresponding to the print job received in most-recently executed S201 can be additionally arranged in the main scanning direction. Meanwhile, in a case where the new total width is longer (wider) than the arrangeable width 304, the main controller 111 cannot additionally arrange the image corresponding to the print job received in most-recently executed S201 in the main scanning direction.

In a case where the main controller 111 determines that the image corresponding to the image data included in the currently received print job (that is most-recently received print job) can be additionally arranged in the main scanning direction of the sheet (YES) in S203, the main controller 111 causes the process to proceed to S204. Meanwhile, in a case where the main controller 111 determines that the image corresponding to the image data included in the currently received print job cannot be additionally arranged side by side in the main scanning direction of the sheet (NO) in S203, the main controller 111 causes the process to proceed to S205.

Figures 7A, 7B, 7C:
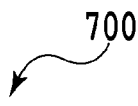
FIG. 7A is a diagram illustrating a specific example of a database.
FIG. 7B is a diagram illustrating a specific example of attribute information.
FIG. 7C is a diagram illustrating a specific example of setting information.

FIGS. 7A to 7C are diagrams illustrating a specific example of a database 700 referred to by the main controller 111. As illustrated in FIG. 7A, in the present embodiment, the reception waiting time, the arrangeable width, the replacement allowance flag, and the maximum acceptable width are registered with the database 700 while being associated with attribute IDs, respectively. Note that the database 700 illustrated in FIG. 7A is stored in the RAM 114. In the database 700, the attribute IDs are identifiers assigned to the respective attributes as illustrated in a table of FIG. 7B. Note that the table illustrated in FIG. 7B is also stored in the RAM 114. In the database 700, the reception waiting time is the maximum time in which the main controller 111 can suspend execution of printing and wait for reception of a next print job since reception of the most recent print job. In the database 700, the replacement allowance flag is an identifier indicating whether replacement of an image is allowed or not allowed as illustrated in a table of FIG. 7C. Note that the table illustrated in FIG. 7C is also stored in the RAM 114.

As illustrated in FIG. 7A, attribute value of the arrangeable width corresponding to an attribute ID "31" is "1500". Moreover, as illustrated in FIG. 5A, there is no print job received before the print job (job number: 001). Furthermore, the width of the corresponding image 301 is "600" and is shorter than the arrangeable width "1500". Accordingly, in S203, the main controller 111 determines that the image 301 can be arranged in the main scanning direction of the sheet (YES), and causes the process to proceed to S204.

In S204, the main controller 111 refers to the print job list 600 and sets "1" as an initial value of the arrangement flag corresponding to the print job (job number: 001) as illustrated in FIG. 5A. The image corresponding to the print job (job number: 001) is thereby set as the already-arranged image. Note that, as illustrated in FIG. 5C, the main controller 111 later adds a print job (job number: 003) to the print job list 600 as described below. In a case where the main controller 111 sets the arrangement flag corresponding to the added print job (job number: 003) to "1", the main controller 111 changes the arrangement flag corresponding to the print job (job number: 001) to "0".

In S206, the main controller 111 determines whether the margin width of the sheet is longer than the maximum acceptable width or not. In this case, the margin width of the sheet is a width obtained by subtracting the total width obtained by adding up the widths of all the images that are currently set as the already-arranged images from the arrangeable width. In this case, images corresponding to print jobs for which the values of the arrangement flags are "1" (value corresponding to "arrange") among the print jobs in the print job list 600 are the images currently set as the already-arranged images.

In S206, the main controller 111 first refers to the database 700 and obtains the arrangeable width 304 and the maximum acceptable width 305. Moreover, the main controller 111 refers to the print job list 600 and obtains a total width obtained by adding up the widths of the already-arranged images corresponding to the print jobs for which the arrangement flags are set to "1" (a total width of the arranged images). Then, the main controller 111 calculates the margin width of the sheet in a case where the images currently set as the already-arranged images are arranged, based on the arrangeable width and the total width. Specifically, the main controller 111 calculates the margin width by subtracting the total width from the arrangeable width.

In this case, if the process has proceeded from S204 to S206, the main controller 111 uses the total width in a case where the image corresponding to the print job received in most-recently executed S201 is added to the images arranged side by side up to this point, as the total width in this calculation. Meanwhile, if the process has proceeded to S206 after the replacement of the image in S205, the main controller 111 uses the total width in a case where a replaceable image is replaced with the image corresponding to the print job received in most-recently executed S201, as the total image in this calculation. Furthermore, if the process has proceeded to S206 without arrangement of a new image in S205, the main controller 111 uses a width as described below as the total width in this calculation. Specifically, the total width in a case where the image corresponding to the print job received in most-recently executed S201 is not added to the images arranged side by side up to this point is used as the total width in this calculation. In this case, the replaceable image is an image that can be replaced with the image corresponding to the print job received in most-recently executed S201 (that is the currently received print job). Moreover, the replaceable image is an image included in one or more already-arranged images in the currently-handled main scanning, and is such an image that the margin width after replacement of the replaceable image to the image of the newly-received print job is zero or longer and is shorter than the margin width before the replacement.

In a case where the main controller 111 determines that the calculated margin width of the sheet is longer than the maximum acceptable width (YES) in S206, the main controller 111 causes the process to proceed to S207 to wait for reception of the next print job, in order to avoid that a large amount of sheet is wasted without another image that is added and arranged at the current conveyance direction position.

Meanwhile, in a case where the main controller 111 determines that the calculated margin width of the sheet is equal to or shorter than the maximum acceptable width (NO) in S206, the main controller 111 causes the process to proceed to S208 to cause the print engine unit 120 to start printing, because in a case where the calculated margin width of the sheet is equal to or shorter than the maximum acceptable width, there is no wasting of sheet at the current conveyance direction position.

Although the maximum acceptable width stored in the database 700 is used as the maximum acceptable width in the present embodiment, information on the maximum acceptable width may be included in the setting information 402 of the print job, and used as the maximum acceptable width in S206.

As illustrated in FIG. 7A, the arrangeable width is "1500", and the maximum acceptable width is "100". Moreover, as illustrated in FIG. 5A, the width of the already-arranged image 301 corresponding to the print job (job number: 001) for which the arrangement flag is set to "1" is "600". In this case, the already-arranged image is only the image corresponding to the print job (job number: 001). Accordingly, the total width of the already-arranged images is "600". Thus, "900" obtained by subtracting "600" that is the total width of the already-arranged images from the arrangeable width "1500" is the margin width of the sheet. Accordingly, in S206, the main controller 111 determines that the margin width "900" of the sheet is longer than the maximum acceptable width "100" (YES), and causes the process to proceed to S207.

In S207, the main controller 111 refers to the database 700 and obtains the reception waiting time. Moreover, the main controller 111 refers to the print job list 600 and obtains the reception time point of the received print job. Then, the main controller 111 waits for reception of the next print job until the reception waiting time elapses from the reception time point. In a case where the main controller 111 determines that no next print job is received while waiting for print job reception (NO) in S207, the main controller 111 causes the process to proceed to S208. Meanwhile, in a case where the main controller 111 determines that the next print job is received while waiting for print job reception (YES) in S207, the main controller 111 causes the process to return to S201.

Note that, in the present embodiment, the reception waiting time stored in the database 700 is used as the reception waiting time. However, information on the reception waiting time may be included in the setting information 402 of the print job and used as the reception waiting time in step S207.

In the present embodiment, in S207, the main controller 111 detects reception of a print job (job number: 002) to the host IF 112 while waiting for print job reception (YES), and causes the process to return to S201.

Next, a process performed in a second loop is described.

In S201, the host IF 112 receives the second print job transmitted from the host apparatus 190.

In S202, the main controller 111 extracts the image data 401 corresponding to the image 302 from the print job received second, and stores the image data 401 in the RAM 114. Moreover, the main controller 111 extracts the setting information 402 from the print job received second, and registers the setting information 402 with the print job list 600.

Note that, as illustrated in FIG. 5B, in the present embodiment, the main controller 111 assigns "002" to the print job received second, as the job number.

In the determination of S203 by the main controller 111, the arrangeable width is "1500" as illustrated in FIG. 7A. Moreover, as illustrated in FIG. 5A, the width of the already-arranged image 301 corresponding to the print job (job number: 001) that is received before the print job (job number: 002) and for which the arrangement flag is set to "1" is "600". Furthermore, as illustrated in FIG. 5B, the width of the image 302 is "500". Accordingly, in a case where the image 301 and the image 302 are arranged side by side, the width is "1100" that is the total of "600" and "500", and is shorter than the arrangeable width "1500". Thus, the main controller 111 determines that the image 301 and the image 302 can be arranged side by side in the main scanning direction of the sheet (YES) in S203, and causes the process to proceed to S204.

In S204, as illustrated in FIG. 5B, the main controller 111 refers to the print job list 600, and sets "1" as the initial value of the arrangement flag corresponding to the print job (job number: 002). Note that, as illustrated in FIG. 5B, the arrangement flag corresponding to the print job (job number: 001) is left to be set to the initial value "1".

In S206, the main controller 111 first refers to the database 700 and obtains the arrangeable width 304 and the maximum acceptable width 305. In this case, as illustrated in FIG. 7A, the arrangeable width is "1500", and the maximum acceptable width is "100". Furthermore, the main controller 111 refers to the print job list 600 and obtains the total width obtained by adding up the widths of the already-arranged images corresponding to the print jobs for which the arrangement flags are set to "1". In this case, as illustrated in FIG. 5B, the widths of the already-arranged images 301 and 302 corresponding to the print jobs (job numbers: 001 and 002) for which the arrangement flags are set to "1" are "600" and "500", respectively. Accordingly, the total width of the already-arranged images is "1100". Thus, "400" obtained by subtracting "1100" that is the total width of the already-arranged images from the arrangeable width "1500" is the margin width of the sheet. Accordingly, the main controller 111 determines that the margin width "400" of the sheet is longer than the maximum acceptable width "100" (YES) in S206, and causes the process to proceed to S207.

The main controller 111 detects reception of the print job (job number: 003) to the host IF 112 while waiting for print job reception (YES) in S207, and causes the process to return to S201.

Next, a process performed in a third loop is described.

In S201, the host IF 112 receives the third print job transmitted from the host apparatus 190.

In S202, the main controller 111 extracts the image data 401 corresponding to the image 303 from the print job received third, and stores the image data 401 in the RAM 114. Moreover, the main controller 111 extracts the setting information 402 from the print job received third, and registers the setting information 402 with the print job list 600.

Note that, as illustrated in FIG. 5C, in the present embodiment, the main controller 111 assigns "003" to the print job received third, as the job number.

In the determination of S203 by the main controller 111, the arrangeable width is "1500" as illustrated in FIG. 7A. Moreover, as illustrated in FIG. 5C, the widths of the images corresponding to the print jobs (job numbers: 001 and 002) received before the print job (job number: 003) are "600" and "500", respectively. Furthermore, as illustrated in FIG. 5C, the width of the image 303 corresponding to the print job (job number: 003) is "1000". In a case where the image 301, the image 302, and the image 303 are arranged side by side, the total width is "2100" that is the total of "600", "500", and "1000", and is longer than the arrangeable width "1500". Thus, the main controller 111 determines that the image 303 corresponding to the print job (job number: 003) cannot be further arranged side by side in the main scanning direction of the sheet (NO) in S203, and causes the process to proceed to S205.

In S205, the main controller 111 refers to the print job list 600 and the database 700, and tries to replace one of the already-received print jobs with the print job received in most-recent S201 with an intention of reducing the margin width. Details of an image replacement determination procedure (S205) are described later.

In the present embodiment, the main controller 111 determines to replace the image 301 with the image 303. As illustrated in FIGS. 5B and 5C, the main controller 111 thus changes the arrangement flag corresponding to the print job (job number: 001) from "1" to "0". Furthermore, as illustrated in FIG. 5C, the main controller 111 sets "1" as the initial value of the arrangement flag corresponding to the print job (job number: 003).

In S206, the main controller 111 first refers to the database 700 and obtains the arrangeable width 304 and the maximum acceptable width 305. In this case, as illustrated in FIG. 7A, the arrangeable width is "1500", and the maximum acceptable width is "100". Furthermore, the main controller 111 refers to the print job list 600 and obtains the total width obtained by adding up the widths of the already-arranged images corresponding to the print jobs for which the arrangement flags are set to "1". In this case, as illustrated in FIG. 5C, the widths of the already-arranged images corresponding to the print jobs (job numbers: 002 and 003) for which the arrangement flags are set to "1" are "500" and "1000", respectively. Accordingly, the total width of the already-arranged images is "1500". Thus, "0" obtained by subtracting "1500" that is the total width of the already-arranged images from the arrangeable width "1500" is the margin width of the sheet. Accordingly, the main controller 111 determines that the margin width "0" of the sheet is shorter than the maximum acceptable width "100" (NO) in S206, and causes the process to proceed to S208.

In S208, the main controller 111 refers to the print job list 600 to obtain the already-arranged image data corresponding to the print jobs (job numbers: 002 and 003) for which the arrangement flags are set to "1" as illustrated in FIG. 5C, and starts the printing. An instruction of the main controller 111 causes the image processing unit 116 to perform the image process on the image data and stores the image data in the RAM 114. The main controller 111 requests the print controller 122 to print the images corresponding to the image data via the print engine IF 113 and the controller IF 121. The print controller 122 stores the received image data in the RAM 124. The print controller 122 causes the image processing controller 125 to convert the stored print job to the print data such that the print head 130 can use the data for the print operation. Upon generation of the print data, the print controller 122 causes the conveyance control unit 129 to execute conveyance of the sheet, and causes the print head 130 to execute the print operation based on the print data in conjunction with the conveyance.

As illustrated in FIG. 5C, the print engine unit 120 arranges the two already-arranged images (image 302 and image 303) as total corresponding to the print jobs (job numbers: 002 and 003) for which the arrangement flags are set to "1" in the main scanning direction of the sheet. The print engine unit 120 executes the print operation after this arrangement.

In S209, the main controller 111 refers to the print job list 600 and determines whether there is at least one print job left. Note that the already-arranged images corresponding to the print jobs for which the arrangement flags are set to "1" are already printed in S208, and the print jobs of these images are deleted. Accordingly, the arrangement flag corresponding to the print job left in the print job list 600 is "0". In a case where the main controller 111 determines that the print job is left (YES) in S209, the main controller 111 changes the arrangement flag of such a print job from "0" to "1", and causes the process to proceed to S207.

Meanwhile, in a case where the main controller 111 determines that no print job is left in the print job list 600 (NO) in S209, the main controller 111 completes the process.

In the present case, as illustrated in FIG. 5D, the main controller 111 detects that the print job (job number: 001) for which the arrangement flag is set to "0" is left (YES) in S209. That is, the main controller 111 detects that the print job (job number: 001) whose image is not arranged is left (YES) in S209. Accordingly, as illustrated in FIG. 5E, the main controller 111 changes the arrangement flag corresponding to the print job (job number: 001) from "0" to "1", and then proceeds to S207. In a case where the main controller 111 proceeds to S207 and then detects reception of a new print job to the host IF 112 in the reception waiting time (YES), the main controller 111 causes the process to return to S201. Meanwhile, in a case where the main controller 111 proceeds to S207 and then recognizes no reception of a new print job in the reception waiting time (NO), the main controller 111 causes the process to proceed to S208. In S208, the main controller 111 causes the print engine unit 120 to print only the image corresponding to the print job (job number: 001) in the next main scanning.

An example of the image replacement determination procedure in the present embodiment is described next with reference to a flowchart of FIG. 8. In the present embodiment, description is given of a use case where the arrangement flags are operated when receiving the print job (job number: 003) which will be stored in the print job list 600.

Figure 8:
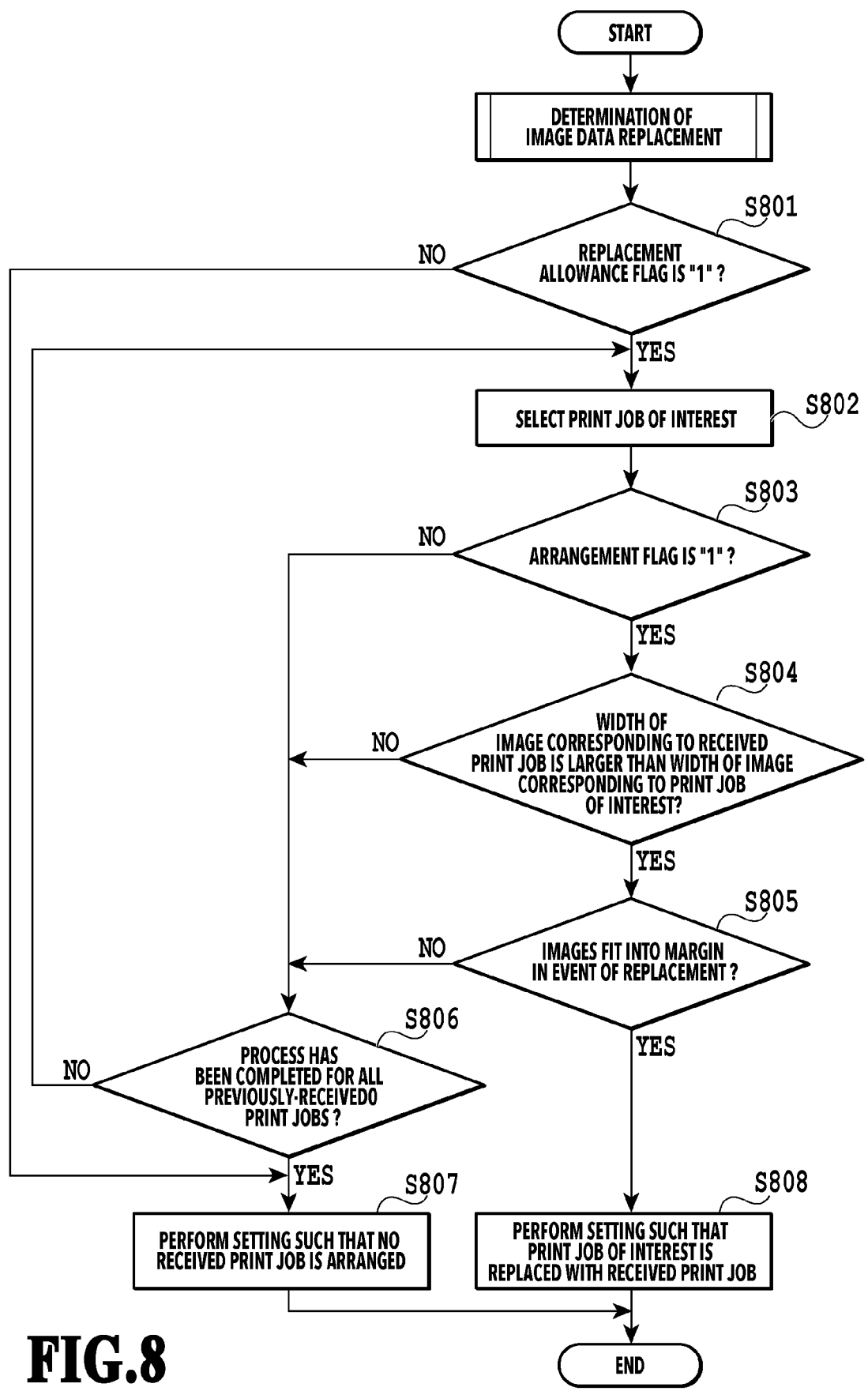
FIG. 8 is a diagram illustrating a flowchart of an image replacement process.

Note that the steps in the flowchart of FIG. 8 are executed by the main controller 111. Since the processes of S802 to S806 are repeated as many times at the maximum as the number of print jobs which are received before the reception of the currently received print job (job number: 003) and images corresponding to which are not printed yet, iterated description will be omitted or simplified.

In S801, the main controller 111 refers to the database 700 and obtains the replacement allowance flag. In a case where the replacement allowance flag is "1" (indicating "allowed") (YES), the main controller 111 causes the process to proceed to S802. Meanwhile, in a case where the replacement allowance flag is "0" (indicating "not allowed") (NO), the main controller 111 causes the process to proceed to S807.

In the present case, as illustrated in FIG. 7A, the main controller 111 detects that the replacement allowance flag (attribute value: 32) is "1" (indicating "allowed") (YES), and causes the process to proceed to S802.

In S802, the main controller 111 selects a print job of interest. In this case, the print job of interest is a print job to be replaced with the currently received print job in a case where conditions are satisfied in the current loop. Specifically, the print job of interest is a print job to be subjected to determination of whether the print job is a print job corresponding to a replaceable image or not by the main controller 111. In the first loop, the main controller 111 selects the print job of "job number: 002" as the print job of interest. Hereinafter, the main controller 111 selects the print job of interest in descending order of job number. Specifically, the main controller 111 selects the print job (job number: 002) received immediately before the currently received print job (job number: 003), as the print job of interest in the first loop. In the subsequent loops, the print jobs arranged in time series are each selected as the print job of interest in descending order of job number (in order going back to the past). This allows a print job received as recently as possible is replaced with the currently received print job. In other words, changes in print order due to the replacement can be minimized as much as possible.

In S803, the main controller 111 determines whether the arrangement flag corresponding to the print job of interest is "1" or not. Since an image of interest corresponding to the print job of interest for which the arrangement flag is "1" is currently an arranged image, there is a possibility that this print job can be replaced with the currently received print job. Meanwhile, since an image of interest corresponding to the print job of interest for which the arrangement flag is "0" is currently not an arranged image, this print job cannot be replaced with the currently received print job.

Accordingly, in a case where the main controller 111 detects that the arrangement flag corresponding to the print job of interest is "1" (YES) in S803, there is a possibility that the image of interest corresponding to the current print job of interest is a replaceable image, and the main controller 111 thus causes the process to proceed to S804. Meanwhile, in a case where the main controller 111 detects that the arrangement flag corresponding to the print job of interest is "0" (NO) in S803, the main controller 111 causes the process to proceed to S806.

In the present case, the main controller 111 detects that the arrangement flag corresponding to the print job (job number: 002) of interest is "1" (YES) in S803 as illustrated in FIG. 5B, and causes the process to proceed to S804.

In S804, the main controller 111 refers to the print job list 600 and obtains the width of the image corresponding to the currently received print job and the width of the image of interest corresponding to the print job of interest. Then, in a case where the width of the image corresponding to the currently received print job is longer than the width of the image of interest corresponding to the print job of interest, there is a possibility that the image of interest corresponding to the current print job of interest is a replaceable image. Accordingly, in such a case, the main controller 111 determines YES in S804, and causes the process to proceed to S805. Meanwhile, in a case where the width of the image corresponding to the currently received print job is equal to or shorter than the width of the image of interest corresponding to the print job of interest (NO) in S804, the main controller 111 causes the process to proceed to S806.

The already-arranged image that can reduce the margin width by being replaced with the image corresponding to the currently received print job can be found from one or more already-arranged images in the currently-handled main scanning by providing S804.

In the present case, as illustrated in FIG. 5C, the width of the image 303 corresponding to the currently received print job (job number: 003) is "1000". Moreover, the width of the image of interest 302 corresponding to the print job (job number: 002) of interest is "500". Accordingly, the main controller 111 determines that the width of the image corresponding to the currently received print job is longer than the width of the image of interest corresponding to the print job of interest (YES) in S804, and causes the process to proceed to S805.

In S805, the main controller 111 first refers to the database 700 and obtains the arrangeable width 304. Next, the main controller 111 refers to the print job list 600 and obtains all the print jobs for which the arrangement flags are set to "1". Specifically, the main controller 111 obtains all the print jobs whose images are the already-arranged images. Then, the main controller 111 determines whether or not, in a case where the image of interest corresponding to the print job of interest is replaced with the image corresponding to the currently received print job, the already-arranged images after the replacement fit into the arrangeable width. That is, the main controller 111 determines whether or not the total width (a second total width) of all the already-arranged images after the replacement is equal to or shorter than the arrangeable width 304.

In this case, replacing the image of interest corresponding to the print job of interest with the image corresponding to the currently received print job is the same as a combination of not arranging the already-arranged image of interest corresponding to the print job of interest and additionally arranging the image corresponding to the currently received print job. Accordingly, the width (a second total width) obtained by adding up the widths of the already-arranged images gathered after the replacement of the image of interest corresponding to the print job of interest with the image corresponding to the currently received print job is equal to a width obtained as follows.

(a) There is calculated the total width (a total width before addition) obtained by adding up the widths of the already-arranged images corresponding to the print jobs for which the arrangement flags are set to "1".

(b) The width of the image corresponding to the print job received in most-recently executed S201 is added to the total width before addition calculated in (a) described above to calculate the total width after addition (a first total width).

(c) There is calculated the width (a second total width) obtained by subtracting the width of the image of interest corresponding to the print job of interest from the width after addition (a first total width) calculated in (b) described above.

In a case where the main controller 111 determines that the total width (a second total width) in the event of replacement is equal to or shorter than the arrangeable width 304 (YES) in S805, the image of interest corresponding to the current print job of interest is a replaceable image. In this situation, in a case where the total width (a second total width) in the event of replacement is equal to or shorter than the arrangeable width 304, the width of the margin obtained by subtracting the total width (a second total width) in the event of replacement from the arrangeable width 304 is equal to or longer than zero. Accordingly, in a case where the main controller 111 makes such determination in S805 (YES), the main controller 111 causes the process to proceed to S808. Causing the process to proceed to S808 means that a replaceable image is found in the current loop. In a case where the main controller 111 determines that the total width (a second total width) in the event of replacement is longer than the arrangeable width 304 (NO) in S805, the main controller 111 causes the process to proceed to S806.

In this case, providing S805 can avoid occurrence of replacement in which replacing the already-arranged image of interest with the image corresponding to the received print job causes the already-arranged images to partially protrude out from the printable region in the sheet in the width direction.

As illustrated in FIG. 7A, the arrangeable width is "1500". Moreover, as illustrated in FIG. 5B, the widths of the already-arranged images 301 and 302 corresponding to the print jobs (job numbers: 001 and 002) for which the arrangement flags are set to "1" are "600" and "500", respectively. Moreover, the width of the image 303 corresponding to the currently received print job (job number: 003) is "1000". In a case where the image 302 of interest corresponding to the print job (job number: 002) of interest is replaced with the image 303 corresponding to the currently received print job, the total value (a total width) of the widths of the images to be arranged is "1600". Accordingly, the main controller 111 determines that the total width of the widths of the images in the event of replacement is longer than the arrangeable width 304 (the replaced image does not fit in the margin) (NO) in S805, and causes the process to proceed to S806.

In S806, the main controller 111 determines whether the process has been completed or not for all the print jobs other than the currently received print job (hereinafter "all the previous print jobs") that are registered with the print job list 600. In a case where the main controller 111 determines that the process has not been completed for all the previous print jobs that are registered with the print job list 600 (NO) in S806, the main controller 111 causes the process to return to S802. A case where the main controller 111 determines that the process is completed (YES) in S806 means that the main controller 111 has been unable to detect a replaceable image, and the main controller 111 thus causes the process to proceed to S807.

In S807, in response to having been unable to detect a replaceable image, the main controller 111 sets the arrangement flag corresponding to the currently received print job to "0" indicating "not arrange" so as not to arrange the image corresponding to the currently received print job. After the execution of S807, the main controller 111 causes the process to return to S206 of FIG. 2.

In the present case, since the processes are not completed for all the previous print jobs that are registered with the print job list 600, the main controller 111 determines NO in S806, and causes the process to return to S802.

Next, description is given of a process performed by the main controller 111 in a second loop after the returning of the process to S802.

In S802, the main controller 111 selects the print job of "job number: 001" as a print job of interest.

As illustrated in FIG. 5B, since the arrangement flag corresponding to the print job (job number: 001) of interest is "1", the main controller 111 determines YES in S803, and causes the process to proceed to S804.

In the determination of S804 by the main controller 111, as illustrated in FIG. 5C, the width of the image 303 corresponding to the currently received print job (job number: 003) is "1000". Moreover, the width of the image 301 of interest corresponding to the print job (job number: 001) of interest is "500". Accordingly, the width of the image corresponding to the currently received print job is longer than the width of the image of interest corresponding to the print job of interest. Thus, the main controller 111 determines YES in S804, and causes the process to proceed to S805.

In the determination of S805 by the main controller 111, as illustrated in FIG. 7A, the arrangeable width is "1500". Moreover, as illustrated in FIG. 5B, the widths of the already-arranged images 301 and 302 corresponding to the print jobs (job numbers: 001 and 002) for which the arrangement flags are set to "1" are "600" and "500", respectively. Furthermore, the width of the image 303 corresponding to the currently received print job (job number: 003) is "1000". In a case where the image 301 of interest corresponding to the print job (job number: 001) of interest is replaced with the image 303 corresponding to the currently received print job, the total width of the images to be arranged is "1500". Accordingly, in a case where the image of interest corresponding to the print job of interest is replaced with the image corresponding to the currently received print job, the condition in which the total width of all the already-arranged images is equal to or shorter than the arrangeable width 304 is satisfied. This condition is same as the condition in which the width of the margin obtained by subtracting the total width from the arrangeable width 304 is equal to or longer than zero in a case where the replacement is executed. Accordingly, the main controller 111 determines YES in S805, and causes the process to proceed to S808.

In S808, as illustrated in FIGS. 5B and 5C, the main controller 111 changes the arrangement flag corresponding to the print job (job number: 001) of interest from "1" indicating "arrange" to "0" indicating "not arrange". Then, as illustrated in FIG. 5C, the main controller 111 sets the arrangement flag corresponding to the currently received print job (job number: 003) to "1" indicating "arrange". In this case, resetting the arrangement flag corresponding to the print job (job number: 001) of interest to "0" is a process performed to prevent the print job (job number: 001) of interest from being arranged at the current conveyance direction position. Moreover, setting the arrangement flag corresponding to the currently received print job (job number: 003) to "1" is a process performed to arrange the image corresponding to the currently received print job (job number: 003) at the current conveyance direction position. Accordingly, such operation of the two flags enables replacement of the print job of interest with the currently received print job.

Next, the main controller 111 causes the process to return from S808 to S206 in FIG. 2.

As apparent from the above description, the main controller 111 functions as a print job processing apparatus for executing the print job processing method illustrated in FIGS. 2 and 8 by executing the program.

Specifically, the main controller 111 functions as an arrangement unit for executing the arrangement step (S204) by executing the program.

Moreover, the main controller 111 functions as a calculation unit for executing the calculation step (S203, S206, and S805) by executing the program.

Furthermore, the main controller 111 functions as a replacement unit for executing the replacement step (S808) by executing the program.

Specifically, the main controller 111 functions as a determination unit for executing the determination step (S203) by executing the program.

Moreover, the main controller 111 functions as a detection unit for executing the detection step (S802, S803, S804, and S805) by executing the program.

Furthermore, the main controller 111 functions as a first print control unit for executing the first pint control step (S808, S206: NO, and S208) by executing the program.

Moreover, the main controller 111 functions as a second print control unit for executing the second print control step (S204, S206: NO, and S208) by executing the program.

Furthermore, the main controller 111 functions as a third print control unit for executing the third print control step (S204, S206: YES, S207: NO, and S208) by executing the program.

Moreover, the main controller 111 functions as a fourth print control unit for executing the fourth print control step (S808, S206: YES, S207: NO, and S208) by executing the program.

Furthermore, the main controller 111 functions as a fifth print control unit for executing the fifth print control step (S204, S206: NO, and S208) by executing the program.

Moreover, the main controller 111 functions as a sixth print control unit for executing the sixth print control step (S204, S206: YES, S207: NO, and S208) by executing the program.

Furthermore, the main controller 111 functions as a first repetition unit for executing the first repetition step (S204, S206: YES, and S207: YES) by executing the program.

Moreover, the main controller 111 functions as a second repetition unit for executing the second repetition step (S808, S206: YES, and S207: YES) by executing the program.

Furthermore, the main controller 111 functions as a third repetition unit for executing the third repetition step (S204, S206: YES, and S207: YES) by executing the program.

Moreover, the main controller 111 functions as a first carry-over unit for executing the first carry-over step (S807) by executing the program.

Furthermore, the main controller 111 functions as a second carry-over unit for executing the second carry-over step (S808) by executing the program.

Moreover, the main controller 111 functions as a third carry-over unit for executing the third carry-over step (S801: NO and S807) by executing the program.

Furthermore, the main controller 111 functions as a fourth carry-over unit for executing the fourth carry-over step (S801:NO and S807) by executing the program.

As described above, replacing the image to be arranged based on the width of the image of the received print job can reduce the margin width of the sheet and prevent wasting of the sheet.

Second Embodiment

In the present embodiment, upon performing the nesting printing, the image forming apparatus 100 first receives two print jobs while waiting for print job reception. A total width obtained by adding up widths of the two images corresponding to the two print jobs is the same as or shorter than the arrangeable width. Then, the image forming apparatus 100 receives a third print job while waiting for print job reception. A width of an image corresponding to the third print job is longer than the current margin (that is the margin in a case where the two images in total corresponding to the first and second jobs are arranged side by side) in the main scanning direction of the sheet. Specifically, the total width obtained by adding up the widths of the three images corresponding to the first, second, and third print jobs is longer than the arrangeable width. Accordingly, only the two images in total corresponding to the first two print jobs (first and second print jobs) are the already-arranged images also after the reception of the third print job. Then, the image forming apparatus 100 receives a fourth print job while waiting for print job reception. A width of an image corresponding to the fourth print job is the same as or shorter than the current margin (that is the margin in a case where the two images in total corresponding to the first and second jobs are arranged side by side) in the main scanning direction of the sheet. Specifically, the total width obtained by adding up the widths of the three images in total corresponding to the first, second, and fourth print jobs is the same as or shorter than the arrangeable width. Accordingly, the three images in total corresponding to the print jobs received first, second, and fourth are arranged, and the printing is executed. The image corresponding to the third print job is carried over to printing after conveyance of the sheet in the conveyance direction.

Figure 9:
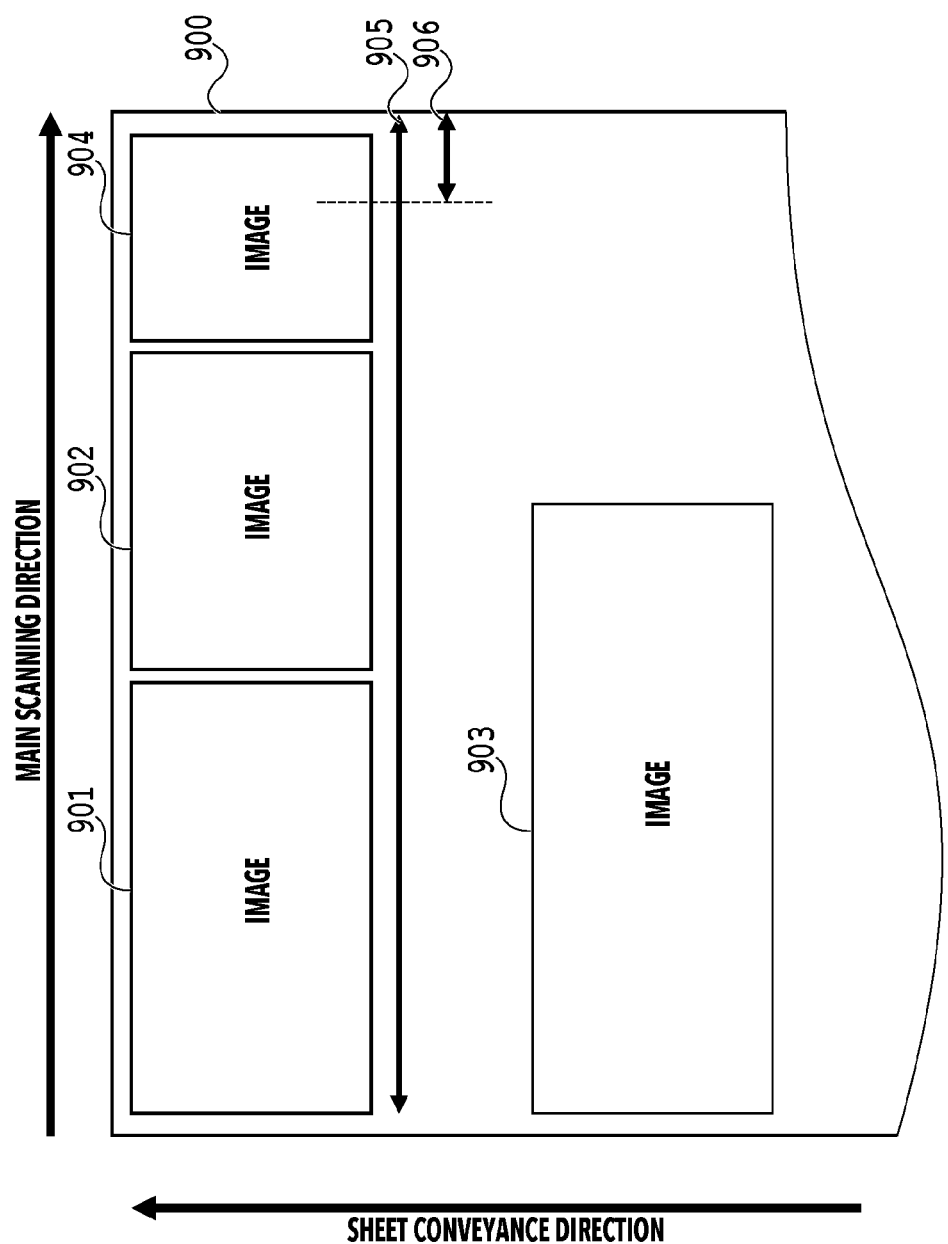
FIG. 9 is a schematic diagram illustrating an arrangement example in a case where multiple images are arranged.

FIG. 9 is a diagram illustrating images arranged on the sheet in the image forming apparatus 100. In the present embodiment, the image forming apparatus 100 receives a print job corresponding to an image 901, a print job corresponding to an image 902, a print job corresponding to an image 903, and a print job corresponding to an image 904 in order of this description. Then, the image forming apparatus 100 arranges the images 901, 902, 903, and 904 on a sheet 900 as illustrated in FIG. 9. The arrangeable width in which images can be arranged in the main scanning direction of the sheet is denoted by 905. Moreover, the maximum acceptable width is denoted by 906.

The present embodiment is described with reference to the outline configuration diagram of FIG. 1, the flowchart of FIG. 2, and the schematic diagram of FIG. 9.

Note that description of portions common to the first embodiment is simplified or omitted, and points unique to the present embodiment are mainly described below.

Since the first and second loops in the flow illustrated in FIG. 2 are similar to those in the first embodiment, description thereof is omitted.

Note that a print job list 1000 is formed as illustrated in FIG. 10A by the first loop and is formed as illustrated in FIG. 10B by the second loop. The print job list 1000 as illustrated in FIGS. 10A and 10B is similar to the print job list 600 illustrated in FIGS. 5A and 5B in the first embodiment.

Next, the process performed in a third loop in the flow illustrated in FIG. 2 is described.

In S201, the host IF 112 receives the third print job transmitted from the host apparatus 190.

In S202, the main controller 111 extracts the image data 401 corresponding to the image 903 from the print job received third, and stores the image data 401 in the RAM 114. Moreover, as illustrated in FIG. 10C, the main controller 111 extracts the setting information 402 from the print job received third, and registers the setting information 402 with the print job list 1000. Furthermore, as illustrated in FIG. 10C, in the present embodiment, the main controller 111 assigns "003" to the print job received third, as the job number.

Figure 11A:
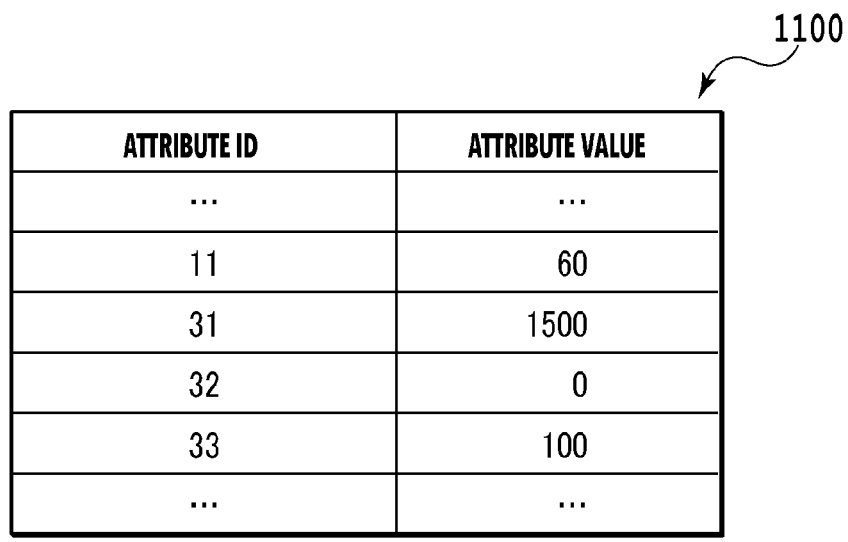
FIG. 11A is a diagram illustrating a specific example of a database.
Figure 11B:
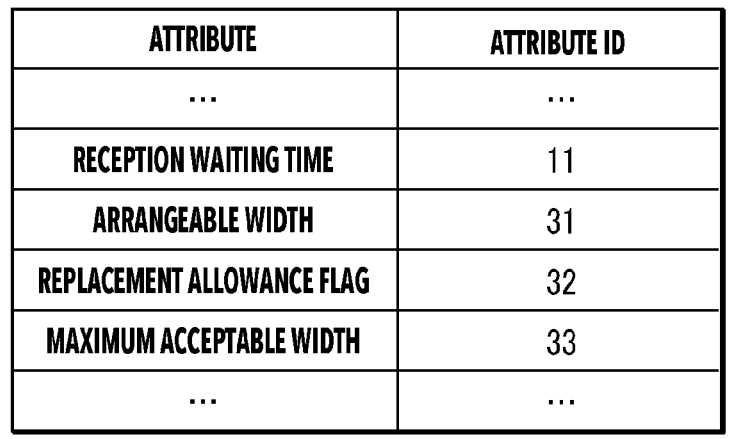
FIG. 11B is a diagram illustrating a specific example of attribute information.
Figure 11C:
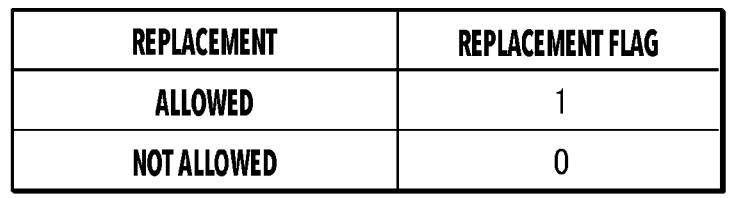
FIG. 11C is a diagram illustrating a specific example of setting information.

FIGS. 11A to 11C are diagrams illustrating specific examples of a database 1100 referred to by the main controller 111 in the present embodiment.

In the present embodiment, in the determination of S203 by the main controller 111, first, the arrangeable width is "1500" as illustrated in FIG. 11A. Moreover, as illustrated in FIG. 10C, the print jobs for which the arrangement flags are set to "1" among the print jobs (job numbers: 001 and 002) received before the print job (job number: 003) are the print jobs (job numbers: 001 and 002). Furthermore, the widths of the image 901 and the image 902 corresponding to the print jobs (job numbers: 001 and 002) are "600" and "500", respectively. Moreover, as illustrated in FIG. 10C, the width of the image 903 corresponding to the print job (job number: 003) is "1000". In a case where the three images in total corresponding to the print jobs (job numbers: 001, 002, and 003) are arranged side by side, the total width is "2100" that is the total of "600", "500", and "1000", and is longer than the arrangeable width "1500". Accordingly, the main controller 111 determines that the image corresponding to the print job (job number: 003) cannot be printed by being added and arranged side by side in the main scanning direction of the sheet (NO) in S203, and causes the process to proceed to S205.

As illustrated in FIG. 10C, in S205, the main controller 111 sets the arrangement flag corresponding to the print job (job number: 003) to "0".

In S206, the main controller 111 first refers to the database 1100 and obtains the arrangeable width 304 and the maximum acceptable width 305. In this case, as illustrated in FIG. 11A, the arrangeable width is "1500", and the maximum acceptable width is "100". Moreover, the main controller 111 refers to the print job list 1000 and obtains the total width obtained by adding up the widths of the already-arranged images corresponding to the print jobs for which the arrangement flags are set to "1". In this case, as illustrated in FIG. 10C, the widths of the already-arranged images 901 and the image 902 corresponding to the print jobs (job numbers: 001 and 002) for which the arrangement flags are set to "1" are "600" and "500", respectively. Accordingly, the total width of the already-arranged images is "1100". Thus, "400" obtained by subtracting "1100" that is the total width of the already-arranged images from the arrangeable width "1500" is the margin width of the sheet. Accordingly, the main controller 111 determines that the margin width "400" of the sheet is longer than the maximum acceptable width "100" (YES) in S206, and causes the process to proceed to S207.

Since the print job (job number: 004) is received by the host IF 112 while waiting for print job reception, the main controller 111 determines NO in S207, and causes the process to return to S201.

Next, a process performed in a fourth loop is described.

In S201, the host IF 112 receives the fourth print job transmitted from the host apparatus 190.

In S202, the main controller 111 extracts the image data 401 corresponding to the image 904 from the print job received fourth, and stores the image data 401 in the RAM 114. Furthermore, the main controller 111 extracts the setting information 402 from the print job received fourth, and registers the setting information 402 with the print job list 1000. Note that, as illustrated in FIG. 10D, in the present embodiment, the main controller 111 assigns "004" to the print job received fourth, as the job number.

In the determination of S203 by the main controller 111, first, the arrangeable width is "1500" as illustrated in FIG. 11A. Moreover, as illustrated in FIG. 10C, the print jobs for which the arrangement flags are "1" among the print jobs (job numbers: 001, 002, and 003) received before the print job (job number: 004) are the print jobs (job numbers 001 and 002). Furthermore, the widths of the image 901 and the image 902 corresponding to the print jobs (job numbers: 001 and 002) are "600" and "500", respectively. Moreover, as illustrated in FIG. 10D, the width of the image 904 corresponding to the print job (job number: 004) is "400". In a case where the three images in total corresponding to the print jobs (job numbers: 001, 002, and 004) are arranged side by side, the total width is "1500" that is the total of "600", "500", and "400", and is equal to the arrangeable width "1500". Accordingly, the image corresponding to the print job (job number: 004) can be printed by being added and arranged side by side in the main scanning direction of the sheet. Accordingly, the main controller 111 determines YES in S203, and causes the process to proceed to S204.

In S204, the main controller 111 refers to the print job list 1000 and sets the arrangement flag corresponding to the print job (job number: 004) to "1" as illustrated in FIG. 10D.

In S206, the main controller 111 first refers to the database 1100 and obtains the arrangeable width 304 and the maximum acceptable width 305. In this case, as illustrated in FIG. 11A, the arrangeable width is "1500", and the maximum acceptable width is "100". Furthermore, the main controller 111 refers to the print job list 1000 and obtains the total width obtained by adding up the widths of the already-arranged images corresponding to the print jobs for which the arrangement flags are set to "1". In this case, as illustrated in FIG. 10D, the widths of the three already-arranged images in total corresponding to the print jobs (job numbers: 001, 002, and 004) for which the arrangement flags are set to "1" are "600", "500", and "400", respectively. Accordingly, the total width of the already-arranged images is "1500". Thus, "0" obtained by subtracting "1500" that is the total width of the already-arranged images from the arrangeable width "1500" is the margin width of the sheet. Accordingly, the margin width "0" of the sheet is shorter than the maximum acceptable width "100", and the main controller 111 thus determines NO in S206, and causes the process to proceed to S208.

In S208, as illustrated in FIG. 10D, the main controller 111 arranges the three already-arranged images in total corresponding to the print jobs (job numbers: 001, 002, and 004) for which the arrangement flags are set to "1" side by side in the main scanning direction of the sheet. Then, after the arrangement, the main controller 111 causes the print engine unit 120 to perform printing.

In S209, the main controller 111 detects that there is the print job (job number: 003) for which the arrangement flag is reset to "0" (YES), that is, there is a print job whose image is unarranged, as illustrated in FIG. 10E. Accordingly, as illustrated in FIG. 10F, the main controller 111 sets the arrangement flag corresponding to the print job (job number: 003) to "1", and causes the process to return to S207.

In a case where no next print job is received by the host IF 112 within predetermine time from the return of the process to S207 (NO), the main controller 111 causes the print engine unit 120 to print the image 903 of the print job (job number: 003).

Next, an example of the image replacement determination procedure in the present embodiment is described with reference to the flowchart of FIG. 8. In the present embodiment, description is given of a use case where the arrangement flag is to be determined in the reception of the print job (job number: 003) illustrated in print job list 1000.

With reference to FIG. 8, since the replacement allowance flag is "0" indicating "not allowed" (NO) as illustrated in FIG. 11A, in S801, the main controller 111 causes the process to proceed to S807.

In S807, the main controller 111 performs the following flag operation in response to the replacement being "not allowed". Specifically, the main controller 111 resets the arrangement flag corresponding to the received print job (job number: 003) to "0" as illustrated in FIG. 10D to prevent that the image corresponding to the received print job from is arranged. Then, the main controller 111 causes the process to return to S206.

As described above, in the present embodiment, an image that is longer than the margin is carried over and then, if an image that is the same as or shorter than this margin is received, the received image is arranged in the margin. Accordingly, wasting of the sheet can be prevented.

Other Embodiments

In the aforementioned embodiment, the printing method of the printing apparatus is the inkjet method. However, an adoptable printing method is not limited to this, and may be other printing methods such as an electrophotographic method or a thermal transfer method.

In the aforementioned embodiments, multiple images are printed such that a left end of the sheet and a left end of the leftmost image are aligned. However, multiple images may be printed such that a right end of the sheet and a right end of the rightmost image are aligned. Moreover, the printing may be performed such that left and right margin widths are equal. Furthermore, images may be printed while being justified (such that the left end of the sheet and the left end of the leftmost image are aligned and the right end of the sheet and the right end of the rightmost image are aligned by adjusting a distance between each two adjacent images). Moreover, images may be printed while being centered (such that a distance from the left end of the sheet to the left end of the leftmost image and a distance from the right end of the sheet to the right end of the right most image are made equal without the adjustment of the distance between each two adjacent images).

In the aforementioned embodiment, description relating to a distance of sheet conveyance of images is omitted. Supplementary description is given. An interval between images in the sheet conveyance direction may be adjusted according to the maximum image height in the sheet conveyance direction among heights of multiple images arranged side by side in the main scanning direction at the same position in the conveyance direction. Moreover, the interval between the images in the sheet conveyance direction may be fixed in expectation of the maximum image height.

In the aforementioned embodiment, description relating to relationships between the reciprocating movement of the print head and execution/suspension of printing is omitted. The printing may be performed in both of a forward route and a backward route of the print head that reciprocates, or only in one of the forward route and the backward route.

In the aforementioned embodiments, the print job of interest is selected in order of how close the reception time point is to the currently received print job, from among the print jobs currently registered with the print job list in S802 in each of the loops from S802 to S806. In each loop, the main controller 111 searches for the print job for which the determination is YES in all of S803, S804, and S805. Then, the first print job to be found is selected as the replaceable job (print job corresponding to the replaceable image), and is replaced with the received print job (print job corresponding to the added image). However, for example, the main controller 111 may detect all the print jobs for which the determination is YES in all of S803, S804, and S805, from among all the print jobs currently registered with the print job list. Then, one print job among all the print jobs for which the determination is YES in all of S803, S804, and S805 may be selected as the replaceable job. In this case, for example, a print job having an image with the largest width among the print jobs for which the determination is YES in all of S803, S804, and S805 may be selected as the replaceable job. A situation where the margin width after the replacement is shorter than that in the first embodiment may thereby occur.

In the aforementioned second embodiment, the replacement allowance flag is introduced and, in a case where the replacement allowance flag is "0", no replacement is performed. The replacement allowance flag is stored in the database 1100 and acts on all the currently-handled print jobs. Meanwhile, the replacement allowance flag may be moved to the setting information of each print job. In this case, S801 in which condition branching of the replacement allowance flag occurs is moved to a position between S802 and S803, and the process proceeds to S803 in a case of YES and to S806 in a case of NO.

In this situation, in a case where the replacement allowance flag is "1" for all the print jobs, the operation is the same as that in the first embodiment. Meanwhile, in a case where the replacement allowance flag is "0" for all the print jobs, the operation is the same as that in the second embodiment. Moreover, the user may set the replacement allowance flag to "0" for a print job for which the replacement is desired to be prohibited, and set the replacement allowance flag to "1" for a print job for which the replacement is desired to be allowed.

In a case where the replacement allowance flag is moved to the setting information of each print job, there may be provided a mode in which allowance/non-allowance of the replacement follows the replacement allowance flag, a mode in which the replacement is always allowed irrespective of the value of the replacement allowance flag, and a mode in which the replacement is always prohibited irrespective of the value of the replacement allowance flag.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-093161, filed Jun. 8, 2022, which is hereby incorporated by reference wherein in its entirety.

What is claimed is:

1. A print job processing apparatus that processes print jobs for nesting printing, comprising:
   at least one memory storing instructions; and
   at least one processor executing the instructions to:
   arrange images of the received print jobs side by side in a width direction of a sheet;
   calculate a margin width of the sheet for already-arranged images; and
   replace a replaceable image with an image of a newly-received print job in a case where the image of the newly-received print job is not arrangeable in a margin with the margin width calculated for the already-arranged images, the replaceable image being an image included in the already-arranged images, and the replaceable image being such an image that the margin width after replacement of the replaceable image with the image of the newly-received print job is equal to or longer than zero and is shorter than the margin width before the replacement,
   wherein the at least one processor executing instructions to, in a case where a total width obtained by adding a width of the image of the newly-received print job to a length obtained by adding up widths of the already-arranged images is longer than a width of a printable region in the sheet, determine that the image of the newly-received print job is not arrangeable in the margin with the margin width calculated for the already-arranged images.

2. The print job processing apparatus according to claim 1, wherein
   the margin width after the replacement of the replaceable image with the image of the newly-received print job is obtained by
   a width of a printable region in the sheet
      (a length obtained by adding up widths of the already-arranged images
      a width of the replaceable image
      a width of the image of the newly-received print job), and
   a length of the margin before the replacement of the replaceable image with the image of the newly-received print job is obtained by
   the width of the printable region in the sheet
      the length obtained by adding up the widths of the already-arranged images.

3. The print job processing apparatus according to claim 1, wherein the at least one processor executing instructions to detect an image of interest selected from the already-arranged images as the replaceable image in a case where the image of interest satisfies conditions of
   a width of the image of interest
      a width of the image of the newly-received print job, and
   a length obtained by adding up widths of the already-arranged images
      the width of the image of the newly-received print job
      the width of the image of interest
      a width of a printable region in the sheet.

4. The print job processing apparatus according to claim 1, wherein the at least one processor executing instructions to, in a case where the margin width after the replacement of the replaceable image with the image of the newly-received print job is equal to or shorter than a maximum acceptable width, print the images arranged after the replacement on the sheet.

5. The print job processing apparatus according to claim 1, wherein, in a case where the image of the newly-received print job is arrangeable in the margin with the margin width calculated for the already-arranged images, the image of the newly-received print job is arranged in the margin.

6. The print job processing apparatus according to claim 5, wherein the at least one processor executing instructions to, in a case where the margin width after the arrangement of the image of the newly-received print job in the margin is equal to or shorter than a maximum acceptable width, print the images arranged after the arrangement of the image of the newly-received print job on the sheet.

7. The print job processing apparatus according to claim 5, wherein the at least one processor executing instructions to, in a case where the margin width after the arrangement of the image of the newly-received print job in the margin is longer than a maximum acceptable width and another print job is further received before elapse of reception waiting time, repeat a process with the further-received print job set as the newly-received print job.

8. The print job processing apparatus according to claim 5, wherein the at least one processor executing instructions to, in a case where the margin width after the arrangement of the image of the newly-received print job in the margin is longer than a maximum acceptable width and no print job is further received before elapse of reception waiting time, print the images arranged after the arrangement of the image of the newly-received print job on the sheet.

9. The print job processing apparatus according to claim 1, wherein the at least one processor executing instructions to, in a case where the image of the newly-received print job is not arrangeable in the margin with the margin width calculated for the already-arranged images and the replaceable image is absent, arrange the image of the newly-received print job at a position corresponding to subsequent main scanning.

10. The print job processing apparatus according to claim 1, wherein the at least one processor executing instructions to arrange the replaceable image replaced with the image of the newly-received print job, at a position corresponding to subsequent main scanning.

11. The print job processing apparatus according to claim 1, wherein the at least one processor executing instructions to, in a case where the margin width after the replacement of the replaceable image with the image of the newly-received print job is longer than a maximum acceptable width and another print job is further received before elapse of reception waiting time, repeat a process with the further-received print job set as the newly-received print job.

12. The print job processing apparatus according to claim 1, wherein the at least one processor executing instructions to, in a case where the margin width after the replacement of the replaceable image with the image of the newly-received print job is longer than a maximum acceptable width and no print job is further received before elapse of reception waiting time, print the images arranged after the replacement on the sheet.

13. The print job processing apparatus according to claim 1, wherein the at least one processor executing instructions to, in a case where a replacement allowance flag indicates "not allowed" and the image of the newly-received print job is not arrangeable in the margin with the margin width calculated for the already-arranged images, arrange the image of the newly-received print job at a position corresponding to subsequent main scanning.

14. An image forming apparatus comprising:
the print job processing apparatus according to claim 1, and
a print engine unit.

15. A print job processing method of processing print jobs for nesting printing, the print job processing method comprising:
arranging images of the received print jobs side by side in a width direction of a sheet;
calculating a margin width of the sheet for already-arranged images; and
replacing a replaceable image with an image of a newly-received print job in a case where the image of the newly-received print job is not arrangeable in a margin with the margin width calculated for the already-arranged images, the replaceable image being an image included in the already-arranged images, and the replaceable image being such an image that the margin width after replacement of the replaceable image with the image of the newly-received print job is equal to or longer than zero and is shorter than the margin width before the replacement,
wherein when a total width obtained by adding a width of the image of the newly-received print job to a length obtained by adding up widths of the already-arranged images is longer than a width of a printable region in the sheet, determine that the image of the newly-received print job is not arrangeable in the margin with the margin width calculated for the already-arranged images.

16. A non-transitory computer readable storage medium storing a program causing a computer to execute a print job processing method of processing print jobs for nesting printing, the print job processing method comprising:
arranging images of the received print jobs side by side in a width direction of a sheet;
calculating a margin width of the sheet for already-arranged images; and
replacing a replaceable image with an image of a newly-received print job in a case where the image of the newly-received print job is not arrangeable in a margin with the margin width calculated for the already-arranged images, the replaceable image being an image included in the already-arranged images, and the replaceable image being such an image that the margin width after replacement of the replaceable image with the image of the newly-received print job is equal to or longer than zero and is shorter than the margin width before the replacement,
wherein when a total width obtained by adding a width of the image of the newly-received print job to a length obtained by adding up widths of the already-arranged images is longer than a width of a printable region in the sheet, determine that the image of the newly-received print job is not arrangeable in the margin with the margin width calculated for the already-arranged images.

* * * * *